United States Patent
Furlotti

(10) Patent No.: US 7,621,146 B2
(45) Date of Patent: Nov. 24, 2009

(54) TRANSFER STAR-WHEEL, IN PARTICULAR FOR FLEXIBLE CONTAINERS, AND METHOD FOR COOLING SAID CONTAINERS

(75) Inventor: Filippo Furlotti, Parma (IT)

(73) Assignee: Indag Gesellschaft fur Industriebedarf mbH & Co. Betriebs KG, Eppelheim (DE)

( * ) Notice: Subject to any disclaimer, the term of this patent is extended or adjusted under 35 U.S.C. 154(b) by 291 days.

(21) Appl. No.: 10/593,916

(22) PCT Filed: Mar. 25, 2004

(86) PCT No.: PCT/IT2004/000152

§ 371 (c)(1),
(2), (4) Date: Sep. 22, 2006

(87) PCT Pub. No.: WO2005/092597

PCT Pub. Date: Oct. 6, 2005

(65) Prior Publication Data

US 2007/0209907 A1 Sep. 13, 2007

(51) Int. Cl.
*F25D 25/00* (2006.01)
(52) U.S. Cl. .................................. 62/378; 198/952
(58) Field of Classification Search ............... 62/378, 62/374, 440, 448, 457.1, 63, 80, 266, 336, 62/337, 338, 339, 377, 381, 451, 529, 250, 62/380, 382; 414/450, 453, 546; 198/952, 198/379, 478.1, 470.1, 803.7, 803.9; 53/370.7, 53/372.3, 375.3
See application file for complete search history.

(56) References Cited

U.S. PATENT DOCUMENTS

| 2,759,339 | A | * | 8/1956 | Kundert ..................... 62/278 |
| 3,216,874 | A | | 11/1965 | Brown |
| 3,802,942 | A | | 4/1974 | Doherty et al. |
| 4,640,406 | A | | 2/1987 | Willison |
| 4,811,761 | A | * | 3/1989 | Huvey ....................... 138/122 |
| 4,920,763 | A | * | 5/1990 | Provest et al. .............. 62/378 |
| 4,936,756 | A | * | 6/1990 | Shimizu et al. ............ 417/371 |
| 5,343,714 | A | * | 9/1994 | Kiczek et al. .............. 62/381 |

(Continued)

FOREIGN PATENT DOCUMENTS

CH    689 007 A    7/1988

(Continued)

OTHER PUBLICATIONS

International Search Report in International patent appln. No. PCT/IT2004/000152, dated Dec. 22, 2004.

*Primary Examiner*—Cheryl J Tyler
*Assistant Examiner*—Justin Loffredo
(74) *Attorney, Agent, or Firm*—Stroock & Stroock & Lavan LLP

(57) ABSTRACT

The invention relates to a system for cooling a sealed portion of a container, the apparatus having a transferring arrangement for transferring one or more containers; and a plurality of cooling arrangements with one or more gripping mechanisms for gripping the containers and one or more cooling mechanisms for cooling one or more sealed portions of the containers. Preferably, the cooling arrangements are constructed and arranged to cool the sealed portions of the containers while the containers are being transferred.

16 Claims, 4 Drawing Sheets

U.S. PATENT DOCUMENTS

| | | | |
|---|---|---|---|
| 6,386,816 B1 * | 5/2002 | Urea et al. | 414/453 |
| 6,655,114 B2 * | 12/2003 | Hiramoto et al. | 53/479 |
| 6,938,753 B2 * | 9/2005 | Bonatti et al. | 198/470.1 |
| 6,941,762 B2 * | 9/2005 | Felder et al. | 62/63 |
| 2006/0048486 A1 * | 3/2006 | Laing et al. | 53/469 |

FOREIGN PATENT DOCUMENTS

| | | |
|---|---|---|
| EP | 1 127 793 A | 8/2001 |
| GB | 925 169 A | 5/1963 |

\* cited by examiner

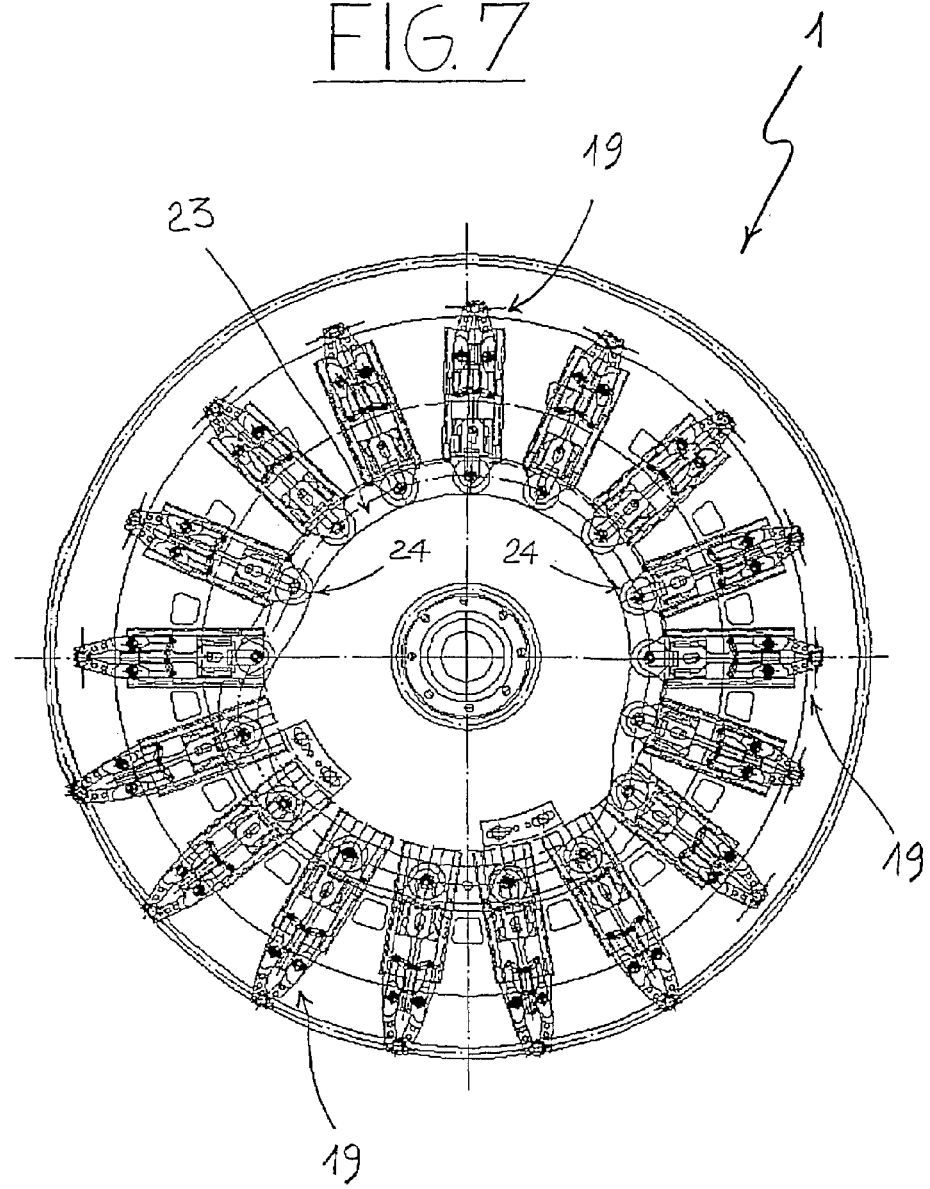

TRANSFER STAR-WHEEL, IN PARTICULAR FOR FLEXIBLE CONTAINERS, AND METHOD FOR COOLING SAID CONTAINERS

TECHNICAL FIELD OF THE INVENTION

The present invention relates to a system for transferring flexible containers, and a method for cooling the containers.

BACKGROUND OF THE INVENTION

There is a need in the industry of producing and filling flexible containers for transferring and cooling, in the shortest possible time, containers shortly after they are formed. Generally, flexible containers comprise a pouch, usually made of polyethylene (PE), and a spout through which the product maintained within the container, for instance a drink or a fruit juice or other beverages, can flow out from the container.

One known method of forming a flexible container is starting from a pouch having an opening, inserting the spout into the opening and securing it within the pouch by sealing the opening.

In accordance with one known method, the sealing operation involves heating the edges of the opening to cause a partial melting of the edges and causing them to adhere to the portion of the spout inserted into the pouch.

One need that the inventors recognized in the methods and systems known in the art is the need to cool the sealed area to prevent the crystallisation of the pouch material to improve its mechanical resistance.

Additionally, the inventors also recognized that there is a need to complete the cooling process in the shortest possible time, to avoid any negative impacts on the efficiency of the production cycle.

SUMMARY OF THE INVENTION

The present invention relates to a system and method for transferring containers, such as flexible containers, the system and method preferably including cooling the containers while transferring the containers. More preferably, it is an objective of the invention to provide a system and method for transferring and cooling containers that do not negatively impact the productivity of producing the containers.

Another objective of the invention is to provide a method for cooling containers while optimizing production.

An additional objective of the invention is to obtain the above results within the scope of a rational, reliable and economical technical solution.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE INVENTION

For a fuller understanding of the invention, reference is had to the following description, taken in connection with the accompanying drawings, in which:

FIG. 7 is a top plan view of a gripping mechanism in accordance with an embodiment of the invention.

DETAILED DESCRIPTION OF PREFERRED EMBODIMENTS

Figure 1:
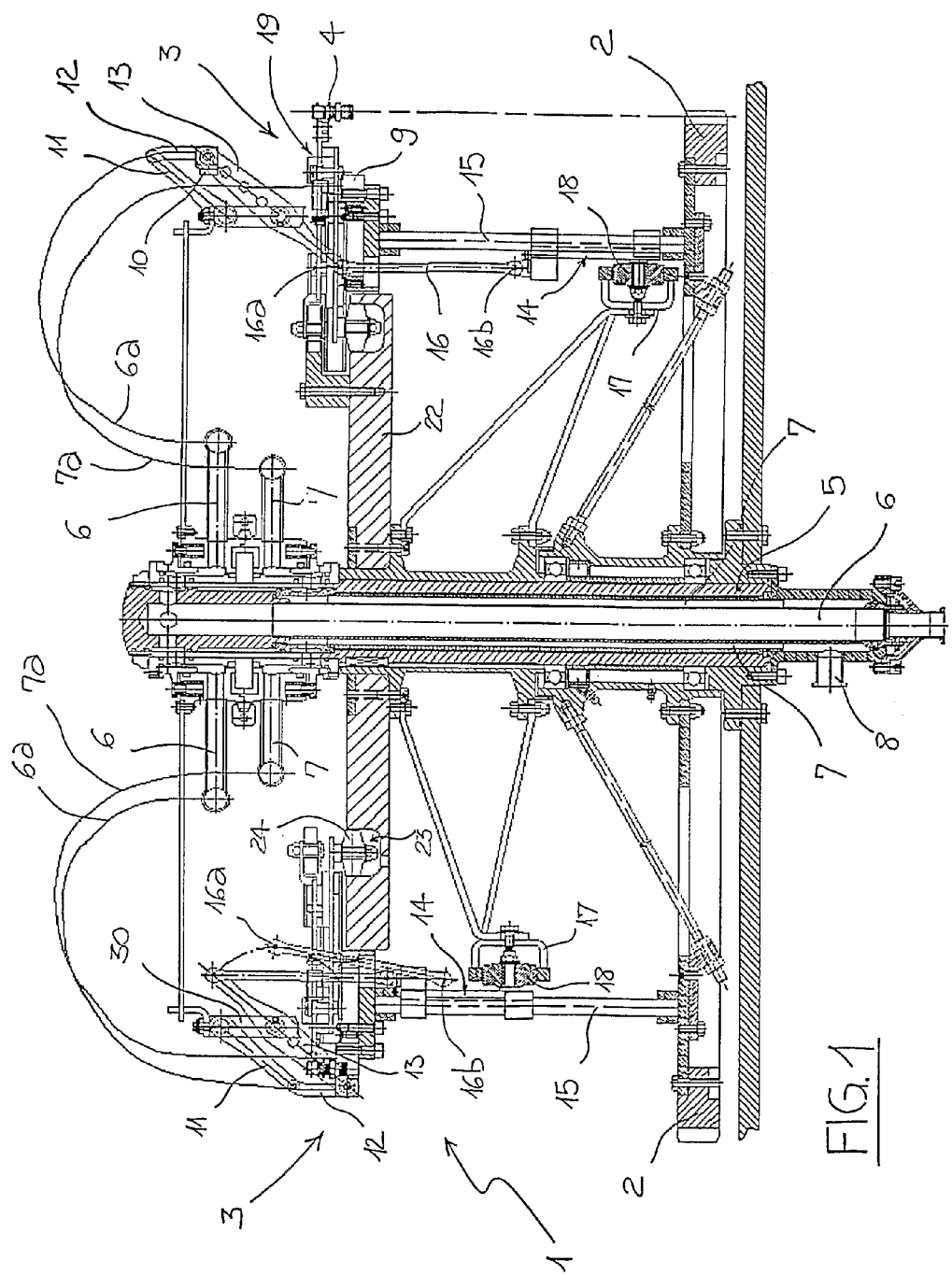
FIG. 1 is a front sectional view of a system in accordance with an embodiment of the invention.

Referring to FIG. 1, a system 1 in accordance with one embodiment of the invention comprises a revolving platform 2 having a plurality of stations 3 for containers, such as flexible containers or pouches, wherein each station 3 comprises a gripping mechanism for gripping the containers. In accordance with one preferred embodiment, the revolving platform 2 is integrally connected to a supporting and rotating shaft 5.

Figure 6:
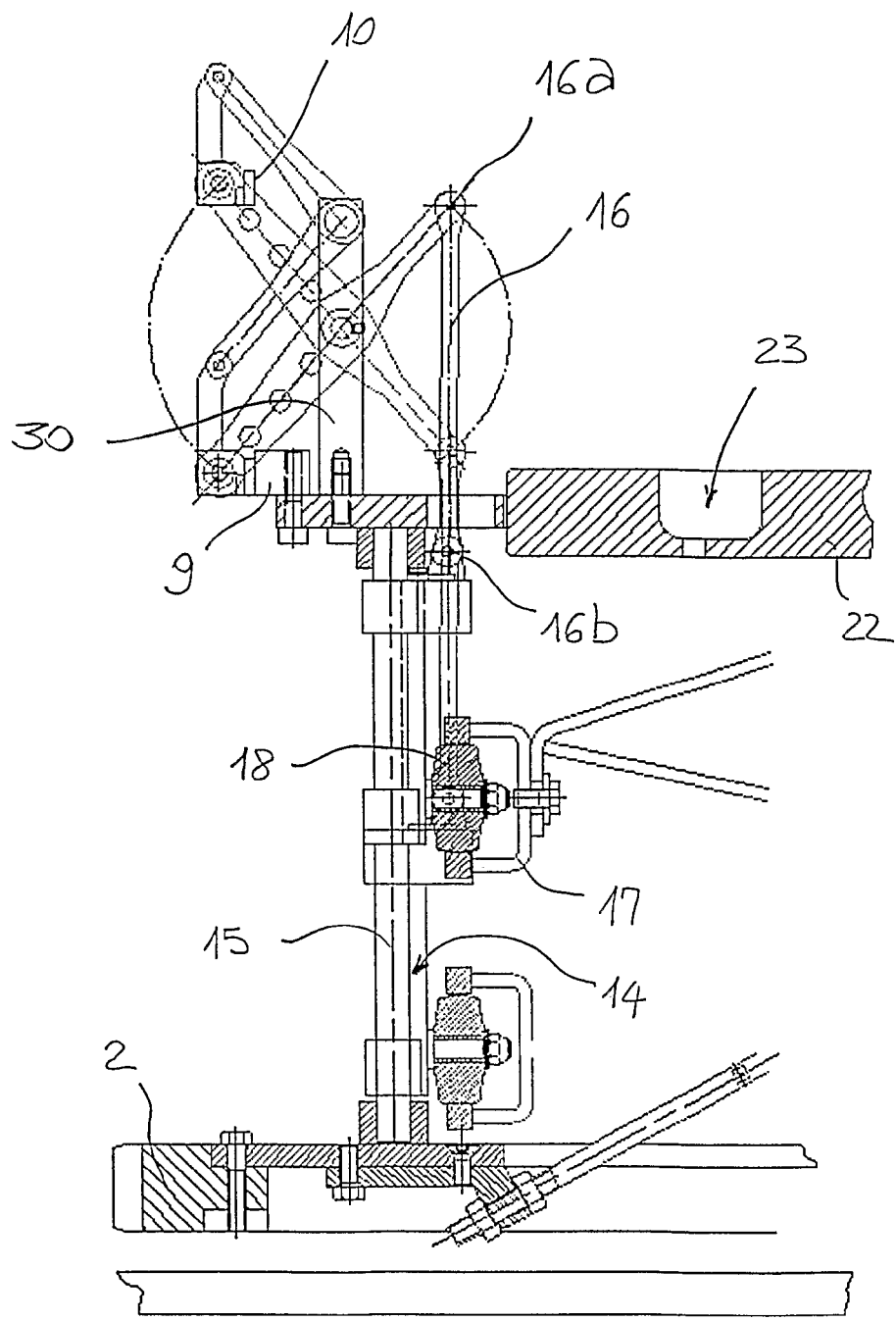
FIG. 6 is a side elevational view of a cooling arrangement in accordance with an embodiment of the invention.

As shown in FIGS. 1 and 6, a system in accordance with an embodiment of the invention comprises a cooling arrangement for cooling previously sealed portions of the containers. In accordance with the embodiment shown, the cooling arrangement comprises a pair of cooling components, for example, jaws 9,10, which are constructed and arranged to approach and touch the sealed portions to be cooled.

The cooling arrangement preferably further comprises a supply mechanism, by way of non-limiting example, a delivery conduit 6, for delivering a cooling fluid to the jaws 9,10, and a removal mechanism, such as a return conduit 7 for removing the fluid from the jaws 9, 10. The cooling arrangement preferably also includes a discharge mechanism, by way of non-limiting example, a discharge conduit 8 for discharging the cooling fluid from the system after the fluid has thermally interacted with the jaws. In a preferred embodiment, the delivery conduit 6 and the return conduit 7 are partially contained within the support shaft 5 of the revolving platform 2. In particular, both the delivery conduit 6 and the return conduit 7 comprise at least a part defined by flexible tubular bodies 6a, 7a, positioned externally to the support shaft 5. As illustrated in FIG. 1, the flexible tubular bodies 6a, 7a can be directly connected to the jaws.

Referring to the embodiment shown in FIG. 1, a first jaw 9 is fixed and a second jaw 10 is movable away from first jaw 9. This can permit the insertion between the jaws of the sealed portions of a container.

In the preferred embodiment as shown, each jaw 9,10 has a recessed portion, being substantially concave, shaped to be complementary to a convexity of the container at the sealed portions. The convexity can be formed by the presence of a spout portion 4, embedded between the sealed edges of the container. The system 1 preferably also comprises an actuating arrangement to actuate the second jaw 10 to move it to or from the first jaw 9.

In a preferred embodiment, the actuating arrangement comprises a plurality of rod-like elements 11, 12, 13 kinematically connected to each other, for example, to define substantially an articulated quadrilateral. Preferably, the rod-like elements 11,12 are 5 hinged on an arm 30 integrally connected to the fixed jaw 9, and the second jaw 10 is connected to at least one of the rod-like elements 11,12,13. The actuating arrangement can further comprise a cursor 14 slidably movable with reciprocating motion along a support guide 15, positioned on the revolving platform 2 at a pre-set distance from the support shaft 5.

Also present in the embodiment illustrated is a connecting rod 16 having a first end 16a connected to one of said rod-like elements 11,12,13 (specifically to the rod-like element designated by the number 13) and a second end 16b connected to the cursor 14.

The actuating arrangement can further comprise a second guide 17 positioned around the support shaft 5 of the revolving platform 2 and within which is engaged a roller 18 pivotally engaged to the cursor 14. The guide 17 is preferably substantially a desmodronic guide.

In the embodiment as shown in FIG. 1, the gripping mechanism comprises a pincer 19 located on the support guide 15 and positioned on the revolving platform 2 at a pre-set distance from the support shaft 5. Particularly, the system 1 comprises a mechanism for moving each pincer 19 in a direction that is substantially radial to the revolving platform 2. Referring to FIGS. 1-5, the mechanism for moving each pincer 19 in the radial direction comprises a sliding seat 20 for a frame 21 of the pincer and a discoidal body 22, connected to the support shaft 5 and having a groove 23 which substantially defines a cam. The mechanism can further comprise a roller 24 connected to the frame 21 of the pincer and slidably housed in the groove 23 present on the discoidal body 22.

Figure 5:
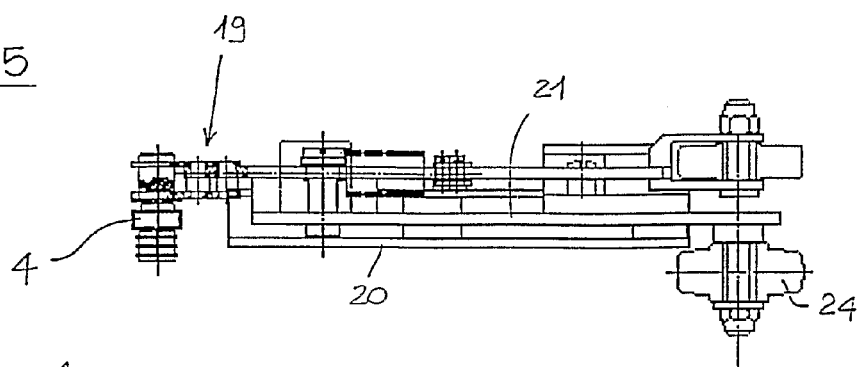
FIG. 5 is a side elevational view of the transfer arrangement of FIG. 4.
Figure 4:
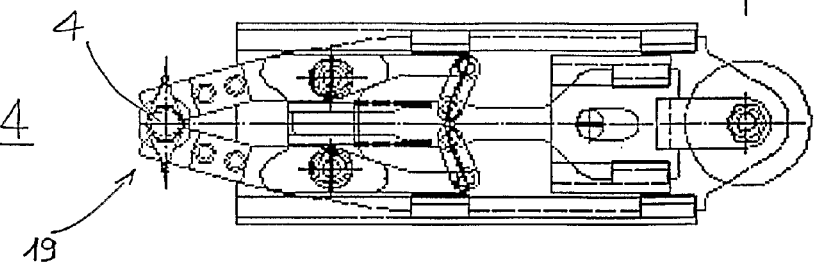
FIG. 4 is a top plan view of a transfer arrangement in accordance with an embodiment of the invention.
Figure 2:
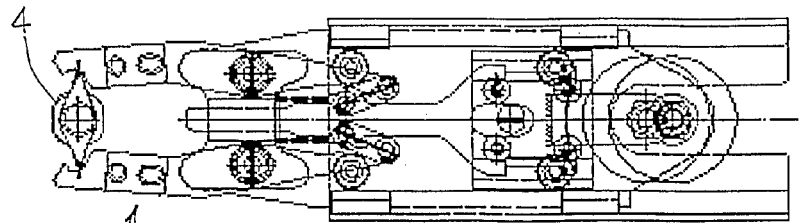
FIG. 2 is a top plan view of a transfer arrangement in accordance with an embodiment of the invention.
Figure 3:
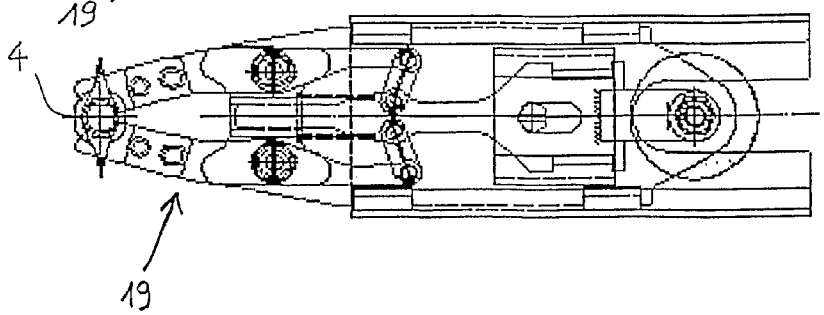
FIG. 3 is a top plan view of a transfer arrangement in accordance with an embodiment of the invention.

One example of how the system operates is provided below:

The pincers 19, while extended radially outward, pick up the containers after the containers are formed, from a forming and sealing station, soon after the containers are sealed. Subsequently; the pincers 19 move radially inward toward the support shaft 5. FIGS. 2-4 show three views of a pincer 19 in three different operative configurations. In the position illustrated in FIG. 2, the pincer 19 is open, with a container position in such a way that the cap of the container is located in between the arms of the pincer 19. FIG. 3 shows the pincer 19 after it has closed on the cap, and FIG. 4 illustrates the position after the pincer has moved radially inward. As shown in FIG. 5, the pincers 19 preferably secure the cap of the container rather than the pouch that is often formed of PE.

The radial motion of the pincers 19 can be caused by the rotation of the platform 2 and the simultaneous sliding of the roller 24 of the frame 21 of each pincer within the groove 23. The pincers 19 preferably move inward until the recently sealed portions of the containers come in contact with the fixed jaw 9. This can be seen in FIG. 7, wherein the apparatus 1 comprises a plurality of pincers positioned concentrically about the shaft 5, wherein the pincers 19 are extended, retracted, or at a position in between depending on which part of groove 23 its respective roller 24 is located. For example, where groove 23 has a smaller radius, the pincer 19 is retracted, and is pushed outward as the radius of the groove 23 increases. As shown in FIG. 7, the pincers are preferably open when in the fully extended position, at the maximum groove radius. Thus the pincers 19 can release the cooled container, preferably at the next station of production, and subsequently pick up a new container to cool and transfer.

Preferably, simultaneously while the pincers 19 are grabbing and transferring the containers, the movable jaw 10 is actuated. Movable jaw 10, which was initially positioned away from the fixed jaw 9 to allow the pincers to grab the container, approaches the fixed jaw 9, actuated by the vertical motion of the cursor 14 along the support guide 15. Such movement of the cursor 14 can be caused by the rotation of the platform 2 and by the simultaneous sliding of the roller 18 inside the guide 17, which is of the desmodronic type. Referring to FIG. 1, the movement of the cursor 14 thrusts the connecting rod 16 upwards, causing the rotation of the articulated quadrilateral constituted by the rod-like elements 11, 12,13. The movable jaw 10 is moved away simply by inverting the direction of motion of the cursor 14, by means of an appropriate geometry of the desmodronic guide 17.

After positioning the sealed portions of the container between the jaws 9, 10, the cooling fluid preferably circulates within the jaws, and interacts thermally with the jaws, thus cooling the sealed portions. The cooling fluid can either flow continuously or the flow can start and stop as desired, for example, to coincide with the movable jaw 10 closing in on the fixed jaw 9. The cooling fluid can be sent to the jaws 9, 10 through the delivery conduit 6, 6a and it exits therefrom through the return conduit 7, 7a, which sends it to a discharge conduit 8. By way of non-limiting example, the cooling fluid flows from the delivery conduit into the movable jaw 10, through one or more of the rod like elements 11, 12, 13 and into the fixed jaw 9, from which the cooling fluid is removed through the return conduit. The cooling fluid can then flow through the support shaft 5 and expunged via discharge conduit 8.

The method for cooling flexible containers in accordance with an embodiment of the present invention comprises the steps of collecting the flexible containers at the output of a first station for forming and sealing the containers; and transferring the flexible containers from said first station to a second processing station, comprising cooling the flexible containers simultaneously while transferring the containers.

In particular, the cooling step occurs by means of indirect heat exchange with a cooling fluid, preferably water at a temperature within a range of about 12° C. to 20° C. The invention can provide several important advantages. First of all, a system, such as a transfer star-wheel, and a method in accordance with the invention can optimize the productivity of installation.

Another advantage of the present invention can be the fact that cooling the sealed portions allows to prevent the crystallisation of polyethylene, thereby improving the mechanical characteristics of the containers and safeguarding their integrity. Advantageously, a transfer star-wheel in accordance with the invention solves the problem of cooling the flexible containers in an extremely rational and reliable manner.

The examples provided herein are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the cooling assembly and transferring assembly can be unitary, wherein the movement of the pincer causes the corresponding movement of the movable jaw. Alternatively, the assemblies can be entirely independent. Additionally, the actuating mechanism, the gripping mechanism, etc. can comprise different structures than those described without deviating from the scope of the invention as a matter of application specific to design choice. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

I claim:

1. A system for cooling a sealed portion of a flexible container, the system comprising:
   a transferring arrangement for transferring one or more containers;
   a platform constructed and arranged to revolve about a shaft and to receive one or more containers thereon; and
   a plurality of cooling arrangements comprising one or more gripping mechanisms for gripping the containers;

wherein the cooling arrangements are constructed and arranged to cool the sealed portions of the containers while the containers are being transferred, wherein the cooling arrangements include:

a pair of cooling components constructed and arranged to secure the sealed portion therebetween, the pair of cooling components including, a fixed cooling component and a displaceable cooling component, wherein the displaceable cooling component is selectively displaceable between an open position for receiving a container and a closed position for securing the container between the fixed cooling component and the displaceable cooling component, a supply mechanism for providing a cooling fluid to at least one cooling component, a removal mechanism for removing the cooling fluid from at least one cooling component, wherein the system further comprises an actuator constructed and arranged to move the displaceable cooling component away from the fixed cooling component, wherein the cooling arrangement further comprises an arm connected to the fixed cooling component; and the actuator comprises a plurality of cooling rods, each cooling rod connected to at least one other cooling rod, wherein at least two cooling rods are pivotally connected to the arm and at least one cooling rod is connected to the displaceable cooling component, wherein the removal mechanism removes the cooling fluid from the cooling component after the cooling fluid has thermally interacted with the cooling components.

2. The system according to claim 1, wherein the cooling fluid flows within the cooling components and thermally interacts with the sealed portions.

3. The system according to claim 1, wherein the cooling arrangements further comprise a discharge mechanism for discharging the cooling fluid from the cooling arrangement.

4. The system of claim 1, wherein a platform is constructed and arranged to revolve about a shaft and wherein the supply mechanism and the removal mechanism are at least partially within the shaft.

5. The system of claim 1, wherein each of the supply mechanism and the removal mechanism comprises a flexible tube.

6. The system of claim 1, wherein each of the supply mechanism and the removal mechanism is connected to a cooling component.

7. The system of claim 1, wherein the cooling fluid comprises water at a temperature within a range of about 12° C. to 20° C.

8. The system of claim 1, wherein each gripping mechanism comprises a pincer.

9. The system of claim 1, wherein each gripping mechanism comprises a pincer constructed and arranged to be radially movable.

10. The system of claim 1, wherein each gripping mechanism comprises:

a pincer arrangement, a sliding seat constructed and arranged to receive the pincer arrangement, a roller connected to the pincer arrangement, a support platform constructed and arranged to support the sliding seat, the support platform comprising a groove for receiving the roller, wherein the roller is slidably movable within the groove.

11. The system of claim 10, wherein the groove comprises a loop shape having a first portion having a first radius and a second portion having a second radius greater than the first radius, wherein the pincer arrangement is in an extended position when the roller is within the second portion of the groove and the pincer arrangement is in a retracted position when the roller is within the first portion of the groove.

12. The system of claim 11, wherein the pincer arrangement is constructed and arranged to grasp a container when the pincer arrangement is in the retracted position and further constructed and arranged to release the container when the pincer arrangement in the extended position.

13. A system for cooling a sealed portion of a container, the system comprising:

a transferring arrangement for transferring one or more containers; and a plurality of cooling arrangements being constructed and arranged to cool the sealed portions of the containers while the containers are being transferred, the cooling arrangements comprising one or more gripping mechanisms for gripping the containers, a fixed cooling component and a displaceable cooling component, wherein the displaceable cooling component is selectively displaceable between an open position for receiving a container and a closed position for securing the container between the fixed cooling component and the displaceable cooling component;

an actuator constructed and arranged to move the displaceable cooling component away from the fixed cooling component, wherein the actuator comprises a plurality of cooling rods, each cooling rod connected to at least one other cooling rod; an arm connected to the fixed cooling component, wherein at least two cooling rods are pivotally connected to the arm and at least one cooling rod is connected to the displaceable cooling component;

a platform constructed and arranged to revolve about a shaft;

a support beam on the platform at a predetermined distance from the shaft, a movable support constructed and arranged to be slidably movable along the support beam, the movable support being connected to at least one cooling rod pivotally connected to the arm, and a guide mechanism having a first end pivotally connected to the movable support and a second end pivotally connected to the shaft.

14. The system according to claim 13, wherein the guide mechanism further comprises a guide roller constructed and arranged to connect the guide mechanism to the movable support.

15. The system according to claim 1, wherein the cooling arrangements are constructed and arranged to transfer the container while cooling the sealed portion of the container.

16. The system of claim 10, wherein:

the pincer arrangement comprises an open position coinciding with the open position of the displaceable cooling component, and a closed position coinciding with the closed position of the displaceable cooling component.

* * * * *